(12) United States Patent
Porter

(10) Patent No.: US 6,239,433 B1
(45) Date of Patent: *May 29, 2001

(54) SENSORS USING DETECTOR ARRAYS

(75) Inventor: Stephen George Porter, Northants (GB)

(73) Assignee: Infrared Integrated Systems. Ltd. (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,683

(22) Filed: Jan. 13, 1998

(30) Foreign Application Priority Data

Jan. 14, 1997 (EP) .................................. 97300196

(51) Int. Cl.[7] ...................................... G01J 5/26
(52) U.S. Cl. ................. 250/338.3; 250/339.14; 250/339.15
(58) Field of Search ............... 250/338.3, 332, 250/339.15, 336.1, 339.02, 338.1, 339.14; 340/567, 578, 584

(56) References Cited

U.S. PATENT DOCUMENTS

| | | |
|---|---|---|
| 4,769,775 * | 9/1988 | Kern et al. .......................... 340/578 |
| 5,313,060 | 5/1994 | Gast et al. . |
| 5,424,544 | 6/1995 | Shelton et al. . |
| 5,534,697 | 7/1996 | Creekmore et al. . |
| 5,567,942 * | 10/1996 | Lee et al. ............................. 250/353 |

FOREIGN PATENT DOCUMENTS

| | | | |
|---|---|---|---|
| 0375205 | * | 6/1990 | (EP) .................................. 250/338.3 |
| 0822526 | | 2/1998 | (EP) . |
| 2200246 | | 7/1988 | (GB) . |
| 9324814 | | 12/1993 | (WO) . |

* cited by examiner

Primary Examiner—Seungsook Ham
Assistant Examiner—Richard Hanig
(74) Attorney, Agent, or Firm—Malin, Haley & DiMaggio, P.A.

(57) ABSTRACT

Sensors using detector arrays (1) are intended for identifying events within a scene (12). A sensor comprising an array of pyroelectric infrared detectors (1) is mounted directly onto an integrated readout circuit (2) so that each of its elements is in electrical contact with one of the inputs to the readout circuit. The detector array (1) on its readout circuit (2) is positioned at the focus of an infrared transmitting lens (11) so that an image of a scene (12) is formed on the array. The readout circuit (2) and array (1) are enclosed in a package (18) which is connected via a circuit board (19) to a microprocessor (20). The microprocessor (20) and readout circuit (2) work together to detect the occurrence and position of events within a scene (12). Application examples are the detection and identification of location of flames or intruders within the field of view.

14 Claims, 3 Drawing Sheets

SENSORS USING DETECTOR ARRAYS

CROSS-REFERENCE TO RELATED APPLICATIONS

This application corresponds to European Patent Application No. 97300196.9 filed Jan. 14, 1997.

STATEMENT REGARDING FEDERALLY SPONSORED RESEARCH OR DEVELOPMENT

Not applicable.

BACKGROUND OF THE INVENTION

1. Field of the Invention

The present invention relates to sensors for identifying the occurrence of events.

2. Description of Related Art

Radiation Detectors

Single and multi-element electromagnetic radiation detectors are currently manufactured for a variety of applications. In particular, pyroelectric infrared radiation detectors with from one to four elements are manufactured in large quantities for use in, for example, passive infrared intruder alarms, flame detecting fire alarms, gas analysis, and pollution monitoring systems. These detectors are typically made by the assembly, using more or less conventional semiconductor assembly processes, of pyroelectric chips with transistor and resistor chips into a suitable enclosure with an infrared transmitting window.

Two-dimensional arrays of pyroelectric detectors are also manufactured for thermal imaging applications. These arrays have a large number of elements, typically 10,000 or more, in order to obtain the best possible spatial resolution in the thermal image. The requirement for a large number of elements, and the consequent requirement for a small element pitch (typically 100 $\mu$m or less), tends to make the manufacturing cost of these arrays relatively high, and therefore unsuitable for low cost applications.

Flame Detectors

One of the methods used to detect fires in a fire alarm system is to use a radiation detector to detect the radiation emitted by a flame. There is a range of electromagnetic radiation wavelengths at which this may be done, but current flame detectors generally operate in either the ultraviolet (UV) or the infrared (IR) regions of the spectrum.

In the case of UV flame detectors, wavelengths shorter than 0.3 $\mu$m are used because the atmospheric ozone layer is opaque in this region and therefore false alarms due to solar radiation are largely eliminated. There are, however, various other sources of false alarms, such as lightning and arc welding.

In the case of IR flame detectors, normal practice is to look for radiation given off by hot carbon dioxide ($CO_2$) gas, in the wavelength region around 4.3 $\mu$m, and to look for the characteristic random flicker frequency of a flame, typically in the region 2 Hz to 20 Hz. There are many other sources of infrared radiation which could give false alarms, but in general they do not give a signal which varies in the same way that a flame flickers, and additional discrimination can be obtained by comparing the signal within the band 4.1 $\mu$m to 4.6 $\mu$m, where hot $CO_2$ radiates, with the signal from a region outside this band, where hot $CO_2$ does not radiate. Hot bodies will radiate both within and without this spectral band.

In spite of these precautions, both UV and IR flame detectors are subject to false alarms. Also, because they are generally based on a single detector, or two detectors viewing the whole scene in different wavelength bands, they do not give any information regarding the spatial distribution of incident radiation, and thence the position of the flame.

Movement Sensors

Pyroelectric detectors are commonly used, in conjunction with sectored infrared lenses, in intruder alarms or for automatically switching on lights. The detector senses the infrared radiation emitted by a person and detects the movement of a person against the ambient background. Because these systems generally use one, two, or, in some cases, four detector elements which, by means of the sectored lens, view the whole of the scene being covered, an alarm condition is registered for any detected movement within the total scene, with no information provided on the location or direction of the movement. They also give no discrimination between persons who must be detected and false targets such as modulated sunlight (e.g., by moving tree leaves and branches), modulated heat sources (e.g., fans or curtains moving in front of radiators), or animals. Similar problems apply to sensors which are used to monitor the movement of vehicles, the problems being more severe for any external application where the field of view is not limited by walls and there are many more potential sources of false alarms.

One example of a known movement detector is disclosed in WO-A-9210812. This document describes an optical movement detection system as part of a direction sensitive counting and switching device for use, for example, to count people boarding a bus. The optical system includes an array of sensor elements arranged in one or more double rows with the sensor elements being connected in pairs to a common rear electrode. Thus, the sensors are not individually monitored.

Thermal Imaging

The multi-element, two-dimensional pyroelectric arrays used in thermal imaging systems are usually provided with a mechanical chopper system for modulating the infrared radiation from a scene. The signals from the various elements of the array are read out in phase with the chopper in a serial raster scan fashion, and subsequently processed to produce an image which is compatible with normal video standards.

BRIEF SUMMARY OF THE INVENTION

The current invention is aimed at providing both temporal and spatial information about the infrared radiation emitted from a scene in order to improve the performance of sensors and systems used, for example, in flame detectors for fire alarms, person or vehicle detectors in intruder alarms or monitoring systems, and detectors for monitoring various properties in process monitoring systems.

One aspect of the present invention provides a sensor comprising an array of detectors and an optical collection means arranged so that spatial information from a scene is focused onto the array, and a readout means for monitoring signals from the elements of the array and identifying the occurrence of an event within a particular part of the field of view, characterized in that, in use, the readout means monitors signals from each of the various elements of the array independently and identifies the occurrence of an event by comparison of these signals. Preferably the array is a two-dimensional array of infrared detectors and the optical collection means is preferably an infrared transmitting lens. The array will preferably include between 10 and 10,000 elements, and typically have at least 64 elements but not more than 1,024 elements. Thus, the current invention uses an infrared detector array of relatively few elements compared with arrays for thermal imaging, thus providing a much lower cost device, but of adequate size to provide sufficient spatial information to improve significantly the performance of flame detectors, motion detectors, and similar sensors.

The array is preferably mounted directly onto and in electrical contact with an integrated circuit which provides the means of reading out the signals from the individual elements and may also enable selective addressing of the elements. The signals from each element may be examined for the frequency content of the signal and compared with the signals from some or all of the other elements. The system has the capability of selecting and concentrating on a particular set of elements in which a signal of interest is observed. In a preferred configuration, the readout circuit is connected to a further circuit such as a microprocessor which monitors the output from the various elements of the array in terms of signal amplitude and frequency. Thus, the current invention allows addressing of the separate elements of the array in a random or non-sequential manner, unlike a typical thermal imaging system where the elements are addressed sequentially, and provides means of comparing the signal amplitude and frequency from one element with that from any other element. Uncooled thermal imagers using pyroelectric detector arrays employ mechanical choppers to modulate the incoming radiation; the current invention is intended to respond to the signal variations inherent in the scene due to, for example, the flickering of flames or the movement of people from one element of the scene to another.

The detector array is preferably an array of pyroelectric detectors and one preferred arrangement is for the array to comprise a layer of ceramic or single crystal pyroelectric material between electrodes, one of which is subdivided into elements which are connected to the inputs of the readout circuit by means of an electrically conducting material such as an electrically conducting adhesive (for example, a silver loaded epoxy) or solder. Preferably, the electrically conducting material is screen printed, for example as a pattern of dots, onto either the readout circuit or the detector array, the other component is then added and the bonds completed by, for example, curing the adhesive or re-flowing the solder. An alternative arrangement of pyroelectric detectors is for the array to comprise a layer of polymer material between electrodes, one of which is subdivided into elements and deposited onto a thermally insulating layer on the surface of the readout circuit in such a manner as to provide electrical connection through the thermally insulating layer to the inputs of the readout circuit. In either of these alternatives, the method of construction is simpler and of lower cost than methods commonly used for manufacturing large, two-dimensional arrays for thermal imaging such as vacuum deposited solder bumps or a thin film air bridge structure.

Preferably, the sensor includes means for comparing the signals from each element with predetermined allowable limits for these signals and indicating an alarm condition when the signals pass outside the specified limits. The sensor may have means for indicating an alarm condition when a signal characteristic of one or more events is present on one or more of the elements. A further preferred feature is for the sensor to provide information relating to the location of the event within the field of view of the array. One example of such an event is the movement of an object, a second example of such an event is the appearance of a flame. In the case of the event being the appearance of a flame, a further preferred arrangement is for the system to include means for the selective application of suppressant to the area in the vicinity of the flame. Thus, another aspect of the invention provides a fire suppression system including a sensor as described above and means for the selective application of suppressant to the area in the vicinity of the flame.

The current invention thus provides a method of providing adequate spatial information on the events within a scene to enable reliable confirmation of an event, such as the presence of a flame or an intruder, without the use of additional information such as that provided by smoke detectors in the case of a fire alarm, or ultrasonic or microwave detectors in the case of an intruder alarm.

The use of an array of infrared detectors makes it possible to use a single sensor to combine two or more of these applications, for example a combined fire and intruder detector. This may be achieved either with one array with a broad band infrared window, or with two arrays with different wavelength infrared filters.

In accordance with these and other objects which will become apparent hereinafter, the instant invention will now be described with particular reference to the accompanying drawings.

BRIEF DESCRIPTION OF THE SEVERAL VIEWS OF THE DRAWINGS

The attached drawings serve to illustrate embodiments of the invention by way of example only.

DETAILED DESCRIPTION OF THE INVENTION

Figure 1:
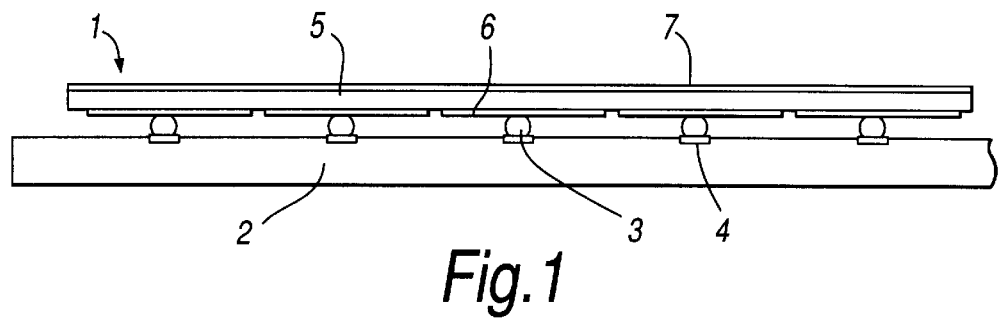
FIGS. 1 and 2 illustrate two possible methods of constructing an array of pyroelectric detectors on an integrated circuit.
Figure 2:
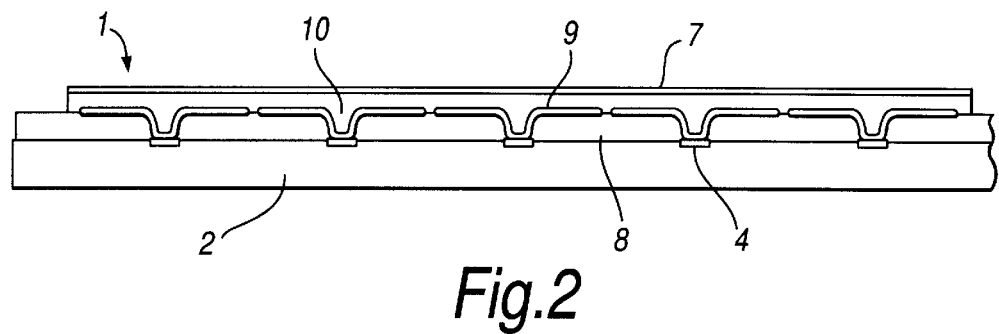

Referring to FIGS. 1 and 2, an array of infrared detectors 1 has each of its elements in direct electrical contact with one of the inputs to a silicon readout circuit 2. One method of manufacturing this assembly, referring to FIG. 1, is to screen print an array of conducting adhesive or solder paste spots 3 onto the silicon circuit in such a way as to make electrical contact with the input bonding pads 4 of the silicon circuit. A ceramic or single crystal chip of pyroelectric material 5, having electrodes 6 and 7 on opposite faces, one of which 6 is subdivided into separate elements, is placed in contact with the adhesive or solder spots and the adhesive is cured or the solder is re-flowed so as to form electrical contact between the individual element electrodes 6 and the input pads 4 of the silicon circuit. Alternatively, referring to FIG. 2, the assembly is manufactured by depositing first a thermally insulating layer 8 onto the surface of the readout circuit 2 and defining holes through this layer over the input pads 4 of the silicon circuit. An electrode 9 which is subdivided into elements is then deposited so as to provide electrical connection through the holes in the thermally insulating layer to the inputs 4 of the readout circuit. A layer of polymer pyroelectric material 10 is then deposited onto this electrode layer followed by a second electrode 7.

Figure 3:
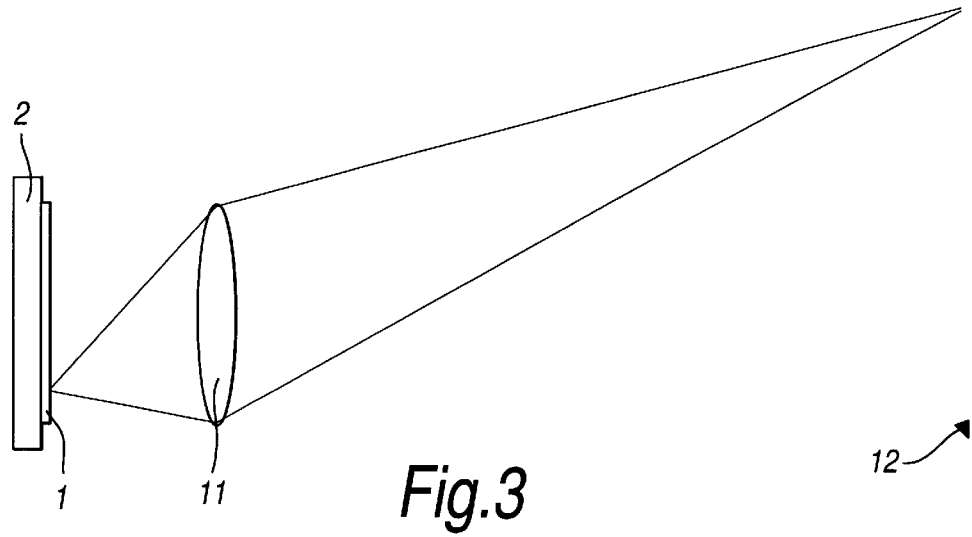
FIG. 3 is a schematic representation of the optical arrangement which allows the formation of an image of a scene on the detector array.
Figure 4:
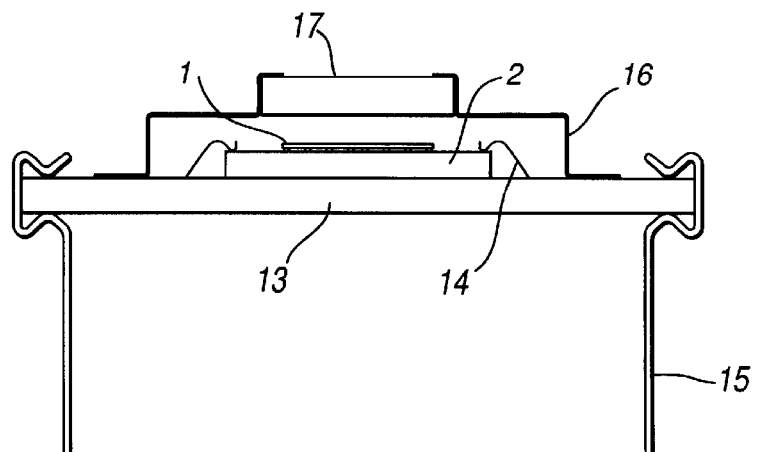
FIG. 4 is an illustration of one possible packaging arrangement for the array.

Referring to FIGS. 3 and 4, the infrared detector array 1, on its silicon circuit 2, is positioned at the most appropriate focal position with respect to an infrared transmitting lens 11 so that an image of a scene 12 is formed on the array 1. The silicon readout circuit 2 is mounted on a carrier 13 to which electrical connection is made by bond wires 14 and which has means of electrical connection 15 to additional electronic circuitry. The array 1 and silicon readout circuit 2 are protected from the environment by a lid 16 containing an infrared transmitting window 17.

Figure 5:
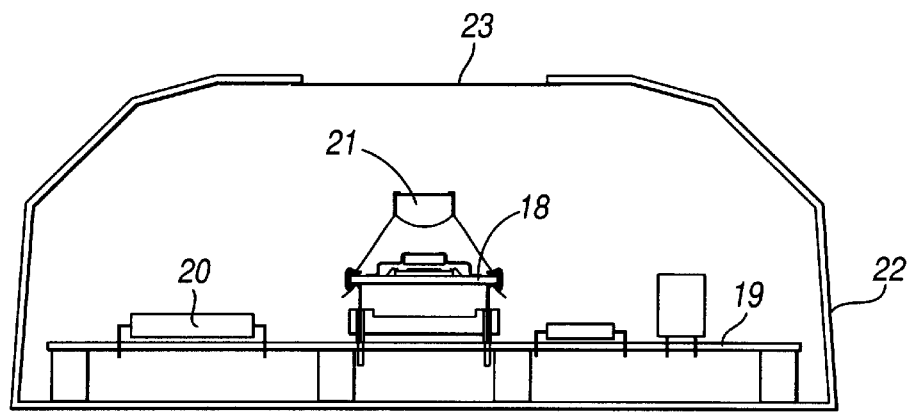
FIG. 5 illustrates schematically a possible arrangement of the array, package, optics, and housing for use as a flame detector.
Figure 6:
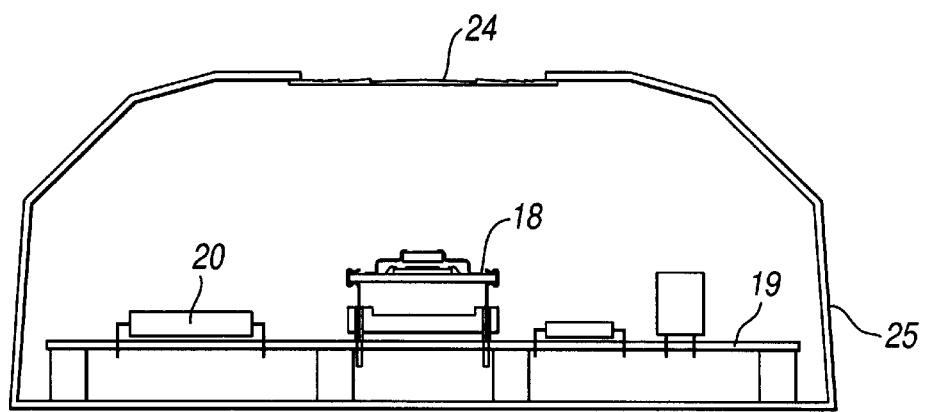
FIG. 6 illustrates schematically a possible arrangement of array, package, optics, and housing for use as an intruder detector.

In one embodiment of the invention, illustrated in FIG. 5, the packaged array and silicon readout circuit 18 is mounted on an electronic circuit board 19 supporting a microprocessor 20 and other electronic components. The assembly also includes an infrared transmitting lens 21 mounted directly on the packaged array 18 and a housing 22 incorporating a further infrared transmitting window 23. In an alternative embodiment, illustrated in FIG. 6, the infrared transmitting lens 24 is incorporated into the housing 25.

The silicon readout circuit 2 is controlled by the microprocessor 20 which is programmed to monitor the signal, in terms of both magnitude and frequency, from each element of the array and compare these with each other. If a signal having the characteristics of the expected event occurs on one or more elements, it is monitored for a specific period of time and, if the characteristics of the expected event persist, including the expected movement or spread from element to element, then an indication is given that an event has occurred.

A sensor comprising an infrared detector array and its associated optics and processing electronics, as described above and illustrated in FIGS. 1 or 2, and 3, 4, and 5 or 6 may be used to provide event detectors with improved reliability, in terms of their ability to detect events and immunity to false alarms, and to provide additional information concerning for example the location, size, and movement of the event. To this end, the array 1 of infrared detectors is preferably in a two-dimensional matrix arrangement. By independently monitoring the signals from each of the elements of the array and comparing these signals with each other, the following advantages are obtained.

False alarms are avoided by careful analysis and comparison, by means, for example, of the microprocessor 20, of the signals from each of the elements of the array. A moving person or vehicle, for example, gives a different signal to the characteristic flicker of a flame, but in addition, the movement across the scene can be traced from element to element, whereas a fire would remain in one part of the scene, but spread to adjacent elements. A piece of rotating machinery may give a signal which could be mistaken for an alarm event, but the microprocessor can be programmed to ignore this particular signal in a given location (i.e., on specified element or elements). Similarly, moving animals can be differentiated from moving people by means of the size and position information provided by an array.

With a conventional single element event detector, a small event far away from the detector covers only a small fraction of the field of view, and therefore gives a small signal. A large event close to the detector, on the other hand, will fill a large fraction of the field of view and will give a large signal. The sensitivity of the alarm system must be such as to give an alarm for both of these extremes. On the other hand, the sensitivity of the system must not be so high that it gives false alarms for a variety of possible scenarios. By using an array of elements and suitable optics, this problem is significantly reduced because a small event far away will be imaged onto only one element, filling a reasonable percentage of its field of view, whereas a large event near to will cover many of the elements, giving a similar magnitude of signal in each. The problem of a very wide range of signal levels is thus overcome and an increased range of detection is made possible.

Examples of the application of this invention to the detection of specific events will now be given.

Flame Detectors

Figure 7:
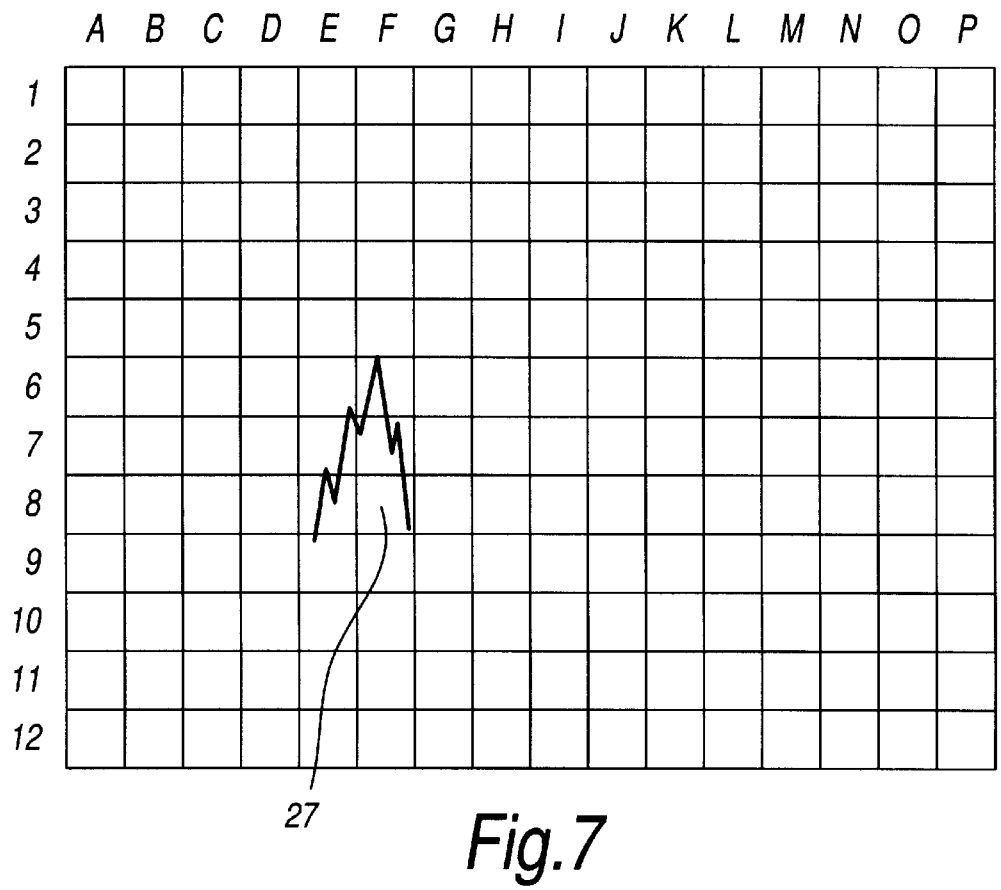
FIG. 7 is a schematic representation of the image of a flame within the sectored field of view of a 16×12 element array.

In the particular example of a flame detector for a fire alarm, when a flame appears in a particular area of the scene being monitored, a signal or signal corresponding to the flame are observed on the element or elements covering that particular part of the scene. This is illustrated in FIG. 7, in which the imaging areas of the individual elements are designated by the grid 26, and the presence of a flame is indicated 27 on elements E7, E8, F6, F7, and F8. Comparison of these signals with that on all the other elements (on which no flame characteristic signal appears) confirms that the signal is due to a flame. Identification of the number and position of the elements on which the flame characteristic signal appears gives information relating to the size and location of the fire. This information can be used, for example, in the automatic application of fire suppressant to the appropriate area of the scene, thus avoiding the necessity to flood the whole area with water or other suppressant. This controlled application of suppressant may be achieved either by turning on a selection of fixed nozzles, or by the control of a robotic extinguisher.

Typically, an infrared filter will be fitted to the array so that it views the scene in a narrow wavelength band around 4:3 $\mu$m, within the $CO_2$ absorption band. A separate infrared sensor may be employed with a band pass filter outside the $CO_2$ absorption band, for example around 5.00 $\mu$m. Comparison of the signals from each of the arrays elements with the signal from this separate sensor will give additional confirmation that the observed signal is from a flame.

Motion Detector

Figure 8:
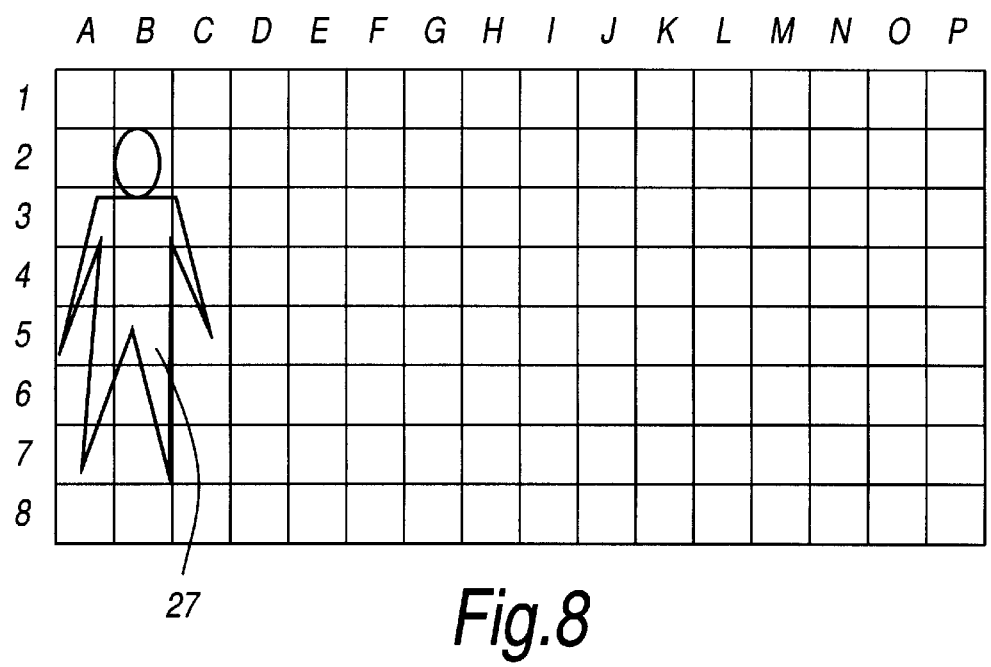
FIG. 8 is a schematic representation of the image of a person within the sectored field of view of a 16×8 element array.

In the particular case of an intruder alarm, when a person enters the scene being monitored, a signal or signals corresponding to the person are observed on one or more elements at the point where the person enters the scene. This is illustrated in FIG. 8, in which the imaging areas of the individual elements are designated by the grid 28, and the presence of a person is indicated 29 on elements A3, A4, A5, A6, A7, B2, B3, B4, B5, B6, B7, C3, C4, and C5. Comparison of these signals with that on all the other elements (on which no person characteristic signal appears) confirms that the signal is due to a person. Identification of the number and position of the elements on which the signal appears and the way in which the signal moves from element to element gives information relating to the size and location of the person. This information can be used in providing additional confirmation that it is a fact a person rather than, for example, a cat or dog, or a curtain moving in front of a radiator. In addition, the movement across the scene can be traced from element to element and a selective alarm condition can be defined for persons moving in a specified direction, for example toward a house but not across the house frontage.

Similar discrimination to that described above may be applied to select signals characteristic of the size, shape, and speed and direction of movement of an object such as a vehicle, but ignore signals due to other events.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A sensor comprising:

a two dimensional array of pyroelectric detector elements and an optical collection means arranged so that infrared radiation from a scene is focused without any imposed modulation onto the array with each element viewing a different part of the scene; and readout means for monitoring signals from the elements of the array to provide temporal and spatial information about infrared radiation emitted from the scene wherein the readout means comprises an integrated circuit onto which the array of detectors is directly mounted in electrical contact therewith and the integrated circuit is connected to a microprocessor having means for monitoring the outputs of the elements of the array independently in terms of signal amplitude and frequency and comparing the signal amplitude and frequency from one element of the array with that from any other element whereby to identify the occurrence of an event within a particular part of the field of view from inherent variations in infrared radiation emitted from the scene.

2. A sensor as in claim 1 in which the array includes at least 10 elements and not more than 10,000 elements.

3. A sensor as in claim 1 in which the array includes at least 64 elements and not more than 1,024 elements.

4. A sensor as in claim 1 in which the optical collection means is an infrared transmitting lens.

5. A sensor as in claim 1 in which the integrated circuit enables selective addressing of the elements of the array.

6. A sensor as in claim 1 in which the array of pyroelectric detectors comprises a layer of ceramic or single crystal material between electrodes, one of which is subdivided into elements which are connected to the inputs of the integrated circuit by means of an array of electrically conducting adhesive or solder bumps.

7. A sensor as in claim 6 in which the conducting adhesive or solder bumps are deposited by a screen printing process.

8. A sensor as in claim 1 in which the array of pyroelectric detectors comprises a layer of polymer material between electrodes, one of which is subdivided into elements and deposited onto a thermally insulating layer on the surface of the integrated circuit in such a manner as to provide electrical connection through the thermally insulating layer to the inputs of the integrated circuit.

9. A sensor as in claim 1 which compares the signals from each element with predetermined allowable limits for these signals, and which is arranged to indicate an alarm condition when the signals pass outside the specified limits.

10. A sensor as in claim 1 including means for indicating an alarm condition when a signal characteristic of one or more events is present on one or more of the elements.

11. A sensor as in claim 10 including means for providing event location information.

12. A sensor as in claim 10 in which one or more of the events is the movement of an object.

13. A sensor as in claim 10 in which one or more of the events is the appearance of a flame.

14. A fire suppression system including a sensor as in claim 11 in which one or more of the events is the appearance of a flame and means for selective application of suppressant to the area in the immediate vicinity of the flame.

* * * * *